United States Patent [19]
Johnson

[11] 4,017,309
[45] Apr. 12, 1977

[54] THIN LAYER LEACHING METHOD

[75] Inventor: Paul H. Johnson, Anaheim, Calif.

[73] Assignee: Holmes & Narver, Inc., Anaheim, Calif.

[22] Filed: Mar. 28, 1975

[21] Appl. No.: 562,962

[52] U.S. Cl. .............................. 75/101 R; 75/116; 75/117; 75/120; 75/121; 423/20; 423/27; 423/41; 299/5

[51] Int. Cl.² .......................................... C22B 1/00

[58] Field of Search ................ 75/101 R, 116, 117, 75/121, 120; 423/20, 27, 41; 299/5

[56] References Cited
UNITED STATES PATENTS

| | | | |
|---|---|---|---|
| 1,825,752 | 10/1931 | Mott | 75/101 R |
| 3,260,593 | 7/1966 | Zimmerley et al. | 75/117 |
| 3,777,004 | 12/1973 | Lankenau et al. | 423/20 |
| 3,808,306 | 4/1974 | Smith et al. | 423/20 |
| 3,840,365 | 10/1974 | Hammes et al. | 75/121 X |

Primary Examiner—G. Ozaki
Attorney, Agent, or Firm—Christie, Parker & Hale

[57] ABSTRACT

A technique is provided for leaching particulate ores for recovering metal values. Ore is crushed to less than about one inch with at least 25% being greater than 4 mesh. The crushed ore is mixed with a small amount of acid and the moistened mixture is kept in a curling pile for about two days for dehydration and induration of the ore. The induration is sufficient that the ore can sustain the weight of a thin layer of about one-half to one meter thick without appreciable compacting. The indurated ore is spread on a permeable substrate in a thin layer about one-half to one meter thick. A leaching solution is then percolated through this thin layer to remove the metal values. The initial effluent leach liquor has high metal values and low acid content and is passed to a solvent extraction system where the metal values are recovered. The solvent extraction raffinate, which is high in acid, is recirculated as a leach liquid. Leaching of the thin layer is essentially countercurrent since progressively leaner leach liquids are used.

Leaching of extremely fine ore is provided by mixing with at least 50% particles larger than about 4 mesh.

64 Claims, 8 Drawing Figures

THIN LAYER LEACHING METHOD

BACKGROUND

Leaching is practiced with a variety of relatively low grade ores for extracting metal values where other techniques may not be feasible or economical. Broadly, leaching involves contact of crushed ore with a leaching solution that selectively attacks the metal bearing constituents for dissolving them and has limited attack on the other constituents of the ore. Leaching is commonly used for copper, uranium, and other ores having relatively low amounts of high value metals.

Typically, the metal values are recovered from the leach solutions by solvent extraction. Solvent extraction involves contact between the metal bearing aqueous leach liquor and an organic solvent that is not miscible with the aqueous phase. The organic phase contains a chelating agent that selectively combines with the desired metal so that its concentration in the organic phase increases and its concentration in the aqueous phase decreases. High rates of metal removal from the aqueous phase can be obtained in two or three stages of solvent extraction. The metals are then removed from the organic phase, typically by acid contact, and recovered as salts or metals. The aqueous raffinate from the solvent extraction may be recycled in the leaching process or discarded to avoid build-up of undesirable contaminants.

The principal methods of leaching metal ores at present include heap, in situ, vat and agitation leaching. Each of these techniques has inherent limitations in terms of efficiency, yield, or capital cost.

Heap and in situ leaching have some similarities. In each case the ore is relatively uncrushed and is in layers from about three to a few hundred meters thick. In in situ leaching the permeable ore remains in a relatively impervious cavity in the ground and leach liquid is percolated through it. In heap leaching the ore is piled in heaps as much as 100 meters deep and the top surface is sprinkled or flooded with leaching solution. These solutions percolate slowly downwardly through the bed and out of the bottom.

In both in situ and heap leaching efficiency is relatively low and the percentage yield of metals from the ore can be low. Metal recoveries are seldom more than about 65%. Factors involved in the low yield include the coarse size of uncrushed ore particles which limits penetration of the leaching solution and leaves the centers of particles essentially unleached; non-uniformity of ore contact by the solution due to channelling within the heap or in situ ore body; uneven distribution of leaching solutions on the surfaces of the heap or in situ ore body; non-uniformity of leaching reagent contact with the ore due to high consumption of the leaching reagent at the top of the heap, resulting in lean leaching solutions further down; loss of metal values or solutions through metal salt recrystallization in dead zones in the ore heap or ore body; losses of solution into ground water and other aquifers; and the like. In many heap leaching processes, the top portions are overleached and the lower portions are underleached.

Vat leaching is the most prevalent technique currently in vogue for treating crushed ores. According to this technique the crushed ore is placed in a large concrete vat and subjected to slow upward percolation of leach solution. Appreciable difficulty can be encountered in such leaching due to poor contact between the ore and leaching solution when excessive fine particles are present. The capital and operating costs for vat leaching are also higher than involved in heap or in situ leaching. Problems of non-uniform contact due to channelling and the like are less pronounced than in heap leaching but may still be present.

When high value ores are being treated, agitation leaching can be used. High operating costs and capital investment are limiting factors. In such a technique crushed and ground ore is agitated in an aqueous leach solution. Dissolved values are rinsed from the leached ore by countercurrent decantation. Such a technique is seldom feasible for low value ores because of the large volumes of material that must be handled. Agitation leaching is also sometimes known as slurry leaching.

It is therefore highly desirable to provide a technique for leaching that can be used on relatively coarsely crushed ores economically and with a high yield. In practice of this invention this can be accomplished by, for example, initially curing the crushed ore, at least 25% of which has a particle size greater than about 4 mesh, for two days or so in contact with a strong acid solution. This curing indurates the ore and solubilizes the metal. A thin layer of this ore in the range of about one-half to one meter thick then has a leach liquid percolated therethrough into a permeable substrate to extract metal values. Leaching of the thin layer employs progressively leaner leach liquids to effectively be countercurrent.

It is believed that the most pertinent prior technique is referred to in a paper entitled "Some Recent Developments in the Extraction of Uranium From Its Ores" by S. E. Smith and K. H. Garrett, in *The Chemical Engineer*, December 1972, pages 440 to 444, a copy of which accompanies this application. According to this paper, the strong acid process involves reduction of the ore particle size to minus one to two millimeters. The ore is contacted with around 10% strong acid solution and cured at elevated temperature (95° C.) for about 18 hours. The solublized uranium is washed from the ore by alternative techniques including vat percolation, reslurrying, or "in a shallow bed by methods similar to those used for washing filter cake". The nature of this process is not further described and if the same as filter cake it would appear to involve only about five to fifteen centimeters thick through which liquid is percolated with or without vacuum assistance.

In practice of this invention it is found important that at least about 25% of the ore has a particle size greater than about 4 mesh (4.7 millimeters) and that the thin layer is in the range of about one-half to one meter thick. Other aspects also differ appreciably from anything suggested by the Smith paper.

Laboratory tests have been conducted to simulate heap leaching. Some of these tests have used narrow columns of ore in the order of 60 centimeters tall through which a leach liquid was percolated. Such tests are used to explore interaction of leaching solutions with various ore samples. Attempts are made to extrapolate such laboratory tests to full scale heap leaching with tall leach heaps, and, in general, the results are appreciably below expectations. It has not previously been recognized that it is important to have a thin layer for leaching rather than a thick heap piled as high as feasible.

BRIEF SUMMARY OF THE INVENTION

Thus, there is provided in practice of this invention according to various aspects of presently preferred embodiments a method for leaching metal values from ore particles wherein the ore particles are contacted with a strong leaching solution for a sufficient time to indurate the ore for sustaining the weight of a layer about one-half to one meter thick without appreciable compacting. The ore is placed on a permeable substrate in a layer about one-half to one meter thick and liquid is percolated therethrough for leaching the metal values. Preferably the layer has more than about 25% by weight particles larger than about 4 mesh. The large particle size can be obtained by limited crushing of the ore before processing, or if finer ore is employed, relatively coarse inert particles may be mixed therewith before processing.

If desired, leaching can be conducted by forming a thin layer of particles on a bank at approximately the angle of repose with the thickness of the layer being less than about one meter. A leach liquid sprayed on the face of the thin layer of particles percolates therethrough and is recovered at the toe of the bank.

DRAWINGS

These and other features and advantages of the present invention will be appreciated as the same becomes better understood by reference to the following detailed description of presently preferred embodiments when considered in connection with the accompanying drawings wherein:

FIG. 8 is a time diagram showing a typical four day cycle of operation of a thin layer leaching plant.

DEFINITIONS

Figure 1:
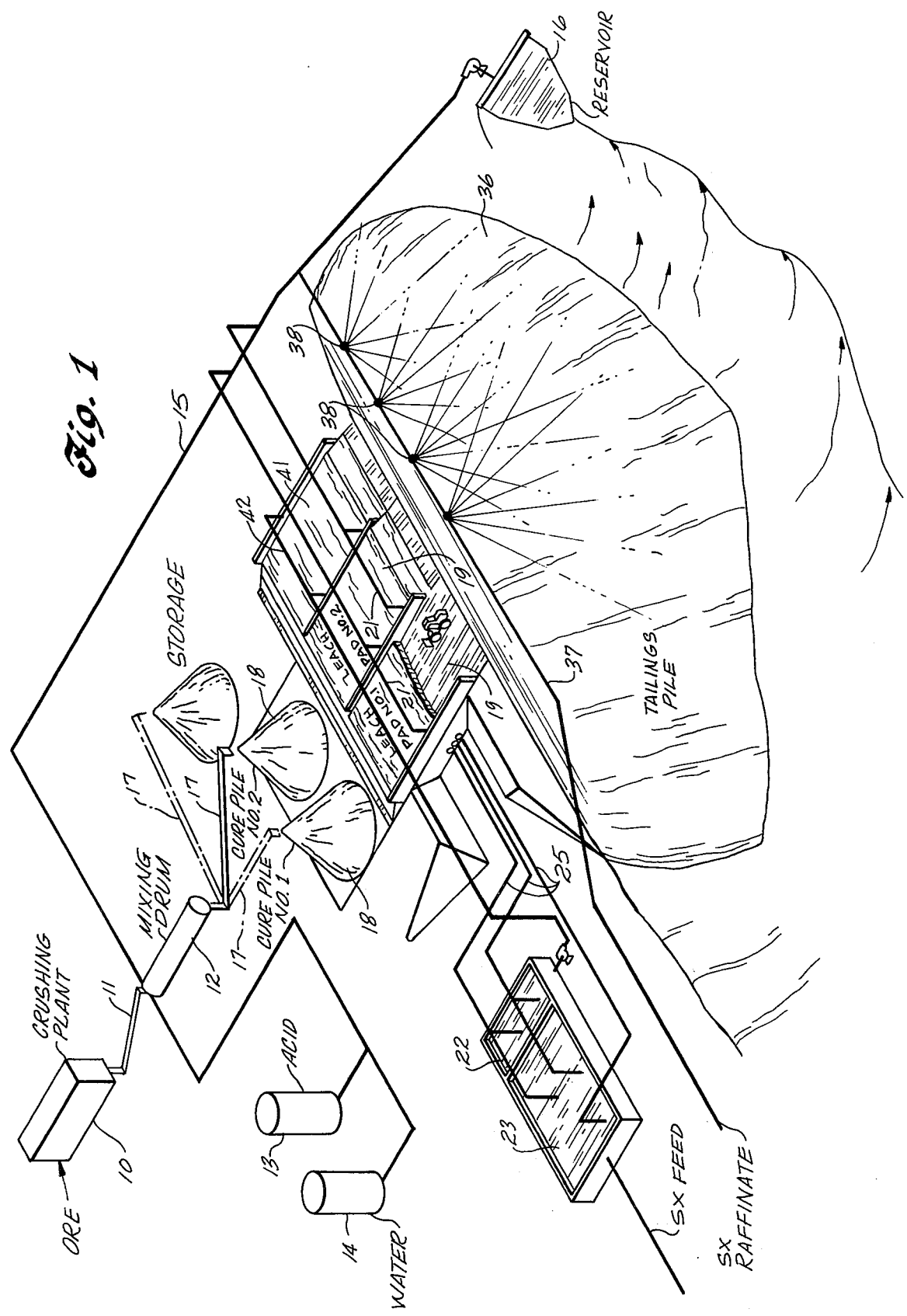
FIG. 1 illustrates in a semi-schematic perspective view a typical leaching plant for practice of this invention.

In the description of this invention certain terminology is used for convenience and is defined as follows:

Thin layer is herein defined as a bed of particles that is so limited in its depth or thickness that when it is treated with a thin layer leaching or rinsing technique, the dissolution or rinsing in the bottom portion of the bed is substantially the same as that obtained in the top portion of the bed. That is, the yield of metal values from a portion of the layer near its bottom surface is not appreciably less than the yield from a portion near its top surface. If a layer is too thick the yield from the bottom can be substantially lessened due to compaction by the weight of overlying material. The thin layer is, however, sufficiently thick that liquid applied to the top does not essentially instantly flow therethrough but percolates gradually.

The actual depth of a thin layer bed suitable for practice of this invention may depend on the permeability of the layer, the density of the ore, the leachability of the particles, the mode of application or removal of the liquid, and/or the degree of leaching or rinsing that is desired. It is found that preferably the thickness of the thin layer bed is in the range of from about ½ to one meter. Somewhat thicker bed up to about one and one half meters are feasible with highly permeable low density beds of readily leachable materials. The total thickness of a bed may be greater when the thin layer comprises only a portion of the bed on a face at approximately the angle of repose or a top layer ripped to have high permeability.

Weak, medium and strong leach solutions herein refer to the concentration of leaching reagents or solvents in the aqueous leaching solutions. Weak and medium leach solutions are typical of the strength of solutions that are currently employed in leaching practice for heap or vat leaching. Typically these have reagent concentrations of no more than several percent. Strong leach solutions are those containing a highly consumable reagent (such as sulfuric acid) in concentration above about 10% by weight. With other reagents such as $NaCN$, $Na_2CO_3$ or the like, the strong leach solution has sufficient reagent to accomplish most of the leaching reaction with a single contact between the ore and leach solution with a total liquid content of about 8 to 18% by weight.

Percolation refers herein to a technique wherein a liquid is distributed over the top surface of a horizontal or somewhat inclined bed of solid particles by spraying or flooding wherein the liquid moves essentially vertically downwardly at a slow rate in the bed under the influence of gravity. In an inclined bed the solution may move partly vertically downwardly and thereafter diagonally downwardly.

DESCRIPTION

It has been discovered in practice of this invention that percolation leaching of only a thin layer of ore is important to assure full yield of metal values from all portions of the layer. In ordinary heap leaching, heaps from about three to a hundred meters thick are formed and leach liquid is permitted to percolate therethrough. The yield of metal values from such a heap is usually relatively low since the weight of overlying ore in the heap compacts the underlying material reducing its permeability and usually leading to channelling of leach solutions. "Yield" is used herein to refer to the percentage of metal recovered in leaching solutions relative to the quantity of metal in the ore.

It has now been discovered that compaction and channelling are minimal in a thin layer and uniform leaching can be obtained throughout the layer to give a high overall yield of metal values. The thin layer does not have enough weight to significantly compact the lower portions of the ore. Once the metal layer becomes too thick only the top portions are adequately leached and the yield from underlying portions decreases dramatically. Thus, it is found that for average density ores a thin layer should be less than about one meter thick to give uniform yield throughout. This value can vary appreciably due to characteristics of the ore being leached. Thus, for example, in a high density ore having a relatively large proportion of slimes, a decrease in yield as a function of thickness of the thin layer may occur as low as about one-half meter. In a very low density permeable ore (such as, for example certain uranimum bearing sandstones) the thin layer can be as much as about one and one-half meters thick without greatly decreasing the yield from bottom portions of the layer.

Thus, for example, in a high density copper ore from Fierro, New Mexico, with a high proportion of sulfides and slimes, a layer about 83 centimeters thick was formed. The yield from the top 45 centimeters was about 69% of the total copper (yield was in the order of 100% of the oxide copper and about 30% of the sulfide copper). The yield in the bottom 38 centimeters, however, was only about 45%. A thin layer of such material should be in the order of about ½ meter for uniform yield throughout.

In a more nearly average density ore having about 0.32% oxide copper from Miami, Arizona, a thicker layer was suitable. Such ore was crushed to a maximum particle size less than about 12 mm and leached for four days with a total of 25 kilograms of sulfuric acid per 1000 kilograms of ore. A layer about 113 centimeters thick was formed. The yield of copper from the top 59 centimeters was about 94.7%. The yield from the next 15 centimeters from the top of the pile was 94.4% or substantially as high as the top portion. The bottom 19 centimeters on the other hand, showed a yield of only 90.9% indicating that for optimum yield the thickness of such a thin layer should be less than about one meter, preferably about 75 centimeters.

In another example, an oxide copper ore having about 1.2% oxide copper from the Korn Kob Mine near Tucson, Arizona, was crushed to a maximum particle size less than about 12 mm. The ore is fairly high in iron oxides and slimes. It was formed in a layer about one meter thick and was leached with sulfuric acid with a consumption of about 50 kilograms per 1000 kilograms of ore. The yield from the top 31 centimeters and from the next 29 centimeters was 96.5%. In the next 27 centimeters the yield dropped to 91.5%. In the bottom 14 centimeters the yield had dropped to 89.3%.

A low density, rather clayey uranium ore from Congress Junction, Arizona, was spread in a layer about one and one-half meters thick. This material has about 0.06% $U_3O_8$ and was leached four days with about 18 kilograms of sulfuric acid per 1000 kilograms of ore. The yield from the top 75 centimeters was about 95%. The yield from the bottom 75 centimeters was about 90%.

In another example, a Nevada gold and silver ore having about 0.4 ounces per ton of gold and about 15 ounces per ton of silver was crushed to less than about 6 mm. This was leached for six days with 0.5% NaCN solution in a layer about 90 centimeters thick. The yield from the top 61 centimeters was about 75% of the silver and 75% of the gold. The yield from the next 15 centimeters was only about 68% of the silver and 50% of the gold. The yield from the bottom 15 centimeters was the same. Thus, a thin layer of such material is preferably no more than about ⅔ meter thick to avoid loss of yield in the bottom portions.

Figure 2:
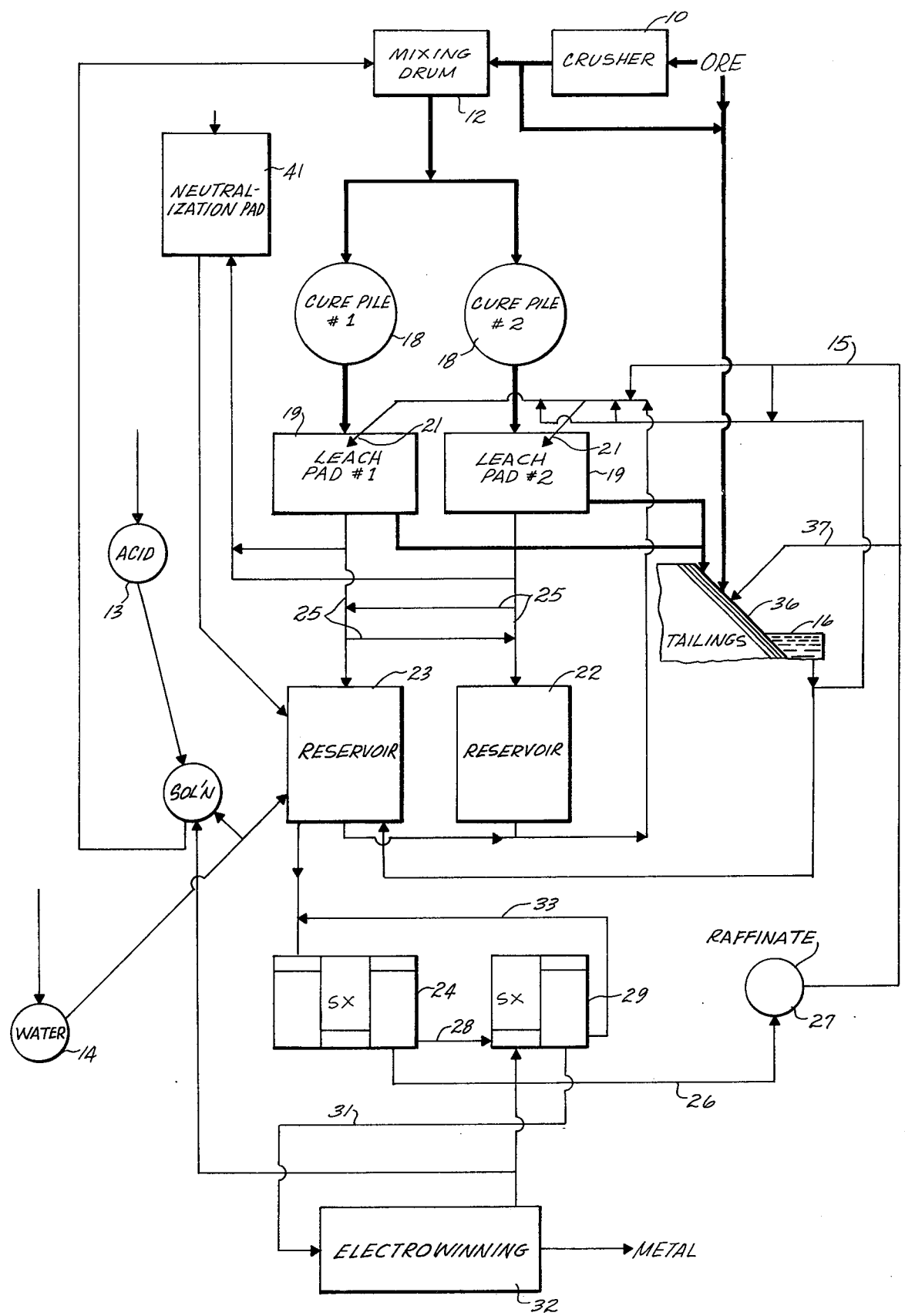
FIG. 2 is a flow diagram for a typical leaching plant.

FIG. 1 illustrates partly schematically a moderate size plant for thin layer leaching of metal values from low grade ore. Typically, for example, such a plant would process about 150 to 1000 tons of ore per day. A larger plant can be provided by either enlarging or duplicating the facilities. A block diagram indicating flow of material in such a plant is illustrated in FIG. 2. In general the same reference numerals are employed in both of these figures even though additional features not found in FIG. 1 are illustrated in the flow diagram. In FIG. 2 flow lines for solids are drawn relatively heavy and lines for liquids are relatively light.

Ore from a mine is first processed in a crushing plant 10 which may include conventional jaw crushers, impact mills and/or roll crushers. If need be, the crushing plant reduces the particle size of the incoming ore to a maximum that depends somewhat on the ore being processed. Typically all the ore is crushed to less than about 15 millimeters, although in some materials the maximum particle size may be as much as twice that size. Over crushing is to be avoided for subsequent processing. Thus, at least about 25% by weight of the crushed ore should be greater than 4 mesh (Tyler standard screen size, or about 4.7 millimeters).

It is found important to have the particle size of the ore after the crushing plant more than about 25% by weight over 4 mesh to provide good leaching. This is sufficiently important that if the particle size of the ore is too small it is desirable to add coarse material to inherently fine ores. The coarse material added can be a compatible ore for simultaneous leaching or may comprise rock particles or coarse tailings essentially inert to the leaching solutions. In the latter case the relatively coarse rock can be wet screened from the ore after leaching and recycled in the process.

Thus, for example, in processing an African schist that naturally has a large proportion of fine particles when crushed, agitation leaching gave a yield of about 80% of the metal values. Such an ore was mixed with relatively coarse quartz particles in a proportion of two parts by weight of quartz and one part by weight of fine ore. Processing in practice of this invention gave a yield of 86% of metal values. It is usually found desirable to use about such proportions when a fine material is to be leached. Thus, a particularly preferred embodiment has about ⅔ coarse material (over 4 mesh) and about ⅓ fine material, either as a result of crushing or as a result of mixing coarse material with fine for purposes of leaching.

Ore from the crushing plant 10 is carried by a conveyor 11 to a conventional mixing drum 12. The mixing drum provides for mixing liquid with the crushed ore and is typically a rotating drum which may include lifting rods. Mixing of ore with liquid can also be obtained with a vibrating screen with spray jets or other mechanical devices.

The liquid added to the mixer 12 with the crushed ore is a strong leach solution. In a typical embodiment wherein copper ore is being leached, the leach solution added to the mixer comprises about 10 to 60% sulfuric acid in water. The total amount of acid added to the mixer should be about 80 to 120% of the acid required for complete leaching of the ore. Any excess acid is recycled in the process as appears hereafter. Adding less than about 80% of the total acid demand diminishes yield even though additional acid may be added to the ore later in the process.

Acid for the mixer comes at least in part from an acid storage tank 13 during normal operations. Some acid may also come from recycled solvent extraction (SX) raffinate which is low in metal values and relatively high in acid content (via lines 37 and 15 in FIG. 1, via line 15 in FIG. 2). Water for the strong solution added to the mixer may come from a water reservoir 14 or from a tailings pile reservoir 16 discussed in greater detail hereinafter. Water is also present in the solvent extraction raffinate if that is employed as an acid source.

The total quantity of liquid in the mixed ore is preferably in the range of about 8 to 18% by weight relative to the ore. This liquid includes added water and acid and also water that may be present in the ore as it comes from the crushing plant. Thus, for example, if the ore is somewhat damp when crushed, less water may be added from other sources. The mixed ore from the mixing drum 12 is thus moistened to resemble damp pea gravel. It is not a paste since the proportion of fines is relatively small. It is essentially a free flowing material. There is no observable separate liquid phase.

This ore, mixed with strong leach solution, is carried from the mixing drum by a swing conveyor 17 to either of two cure piles 18, which are used alternately. Typically, it is found desirable to leave the ore mixed with strong leach solution in the cure pile 18 for about two or three days.

As the ore cures there is what looks like dehydration as it becomes dry and hard. Water and acid in the strong leach solution become metal salt crystals. The total volume of the ore increases as it "fluffs up" during curing with enhanced permeability. The ore also becomes indurated as reaction with the strong leach solution sinters or cements ore particles together. This induration strengthens the ore so that when it is subsequently spread in a thin layer there is minimum compaction of the lower portions of the layer due to weight of overlying portions; that is, the thin layer bed remains somewhat "fluffy", and with high permeability. The curing presolubilizes the metal values, gives desired permeability and still keeps the ore "fluid" for ease in handling in automatic systems.

A principal function of the strong solution leach without percolation is to give each particle in the ore mass, regardless of its size or relative position within the mass, a uniform fast and nearly complete primary leach. This is accomplished since all particles of the ore mass are contacted in an equal manner with sufficient leach reagent to accomplish the bulk of solubilizing of the metal values.

A second aspect is the beneficial effect that strong acid and the limited amount of wetting has on the ore. Warm strong acid solutions rapidly penetrate and break down the ore particles and cause rapid leaching, dehydration, and carbon dioxide evolution. Warming can be provided by preheating the ore or solution, or in most cases is simply an automatic byproduct of reaction of the strong acid with the ore. This primary leaching of the ore particles presolubilizes the metal values and dehydration causes the material to become somewhat indurated, agglomerated and permeable. When this cured material is arranged as a thin layer it allows uniform contact of the ore with downward percolating secondary leaching and rinse solutions. Precuring results in percolation effluents high in metal content and low in acid content. Such high metal, low acid, pregnant solution is advantageous in subsequent metal recovery steps. After curing for about two days in the curing station, which can be either a pad of a silo, the ore is moved from its respective cure pile 18 to one of a pair of leach pads 19 which are also used alternately. Each leach pad comprises an area (e.g. about 12 by 15 meters for a 150 ton per day plant) having a porous substrate described in greater detail hereinafter with respect to FIGS. 4 and 5. The ore is spread on the porous substrate in a thin layer in the range of from about one-half to one meter thick. Normal handling with a rubber tired front loader or scraper is satisfactory for moving the ore from the cure pile to the leach pad. Care is taken to avoid running over the ore bed as it is moved to minimize compaction.

The thin layer spread on the permeable leach pad is preferably at least about one-half meter thick. If a thinner layer is used with a permeable ore like the coarse material used in practice of this invention, liquid sprayed onto the top of the thin layer may flow through rather rapidly rather than gradually percolating therethrough. Further thinner layers require inordinately large areas to handle reasonable tonnages of ore. Since the liquid runs through rapidly, processing can be rapid but the cost of thinner spreading is high and the bed of ore on the leach pad is changed more often.

If the layer is thicker than about one meter there may be compaction of average density ore which inhibits uniform percolation and results in uneven leaching of the ore. This of course diminishes the yield. Further, in a thick layer the liquid is significantly different in the lower portion of the bed than the upper portion due to interaction with the ore particles. This results in non-uniform leaching even if there were little channelling and serves to limit yield. Flow through the thin layer is essentially "plug flow", that is there is limited mixing of later liquid with liquid added to the top of the thin layer earlier. The first liquid added is the first effluent. Reasonably similar effluent is obtained from all parts of the layer since channelling is minimal. In some particularly high permeability low density ores, the thin layer can be about one and one-half meters thick and still give uniform yield.

The high permeability of the thin layer and lack of compaction in its lower portion also increases access of air during the second stage of leaching on the thin layer leaching pad. This enhances oxidation which is quite advantageous in many embodiments; for example, in leaching of sulfide bearing copper ores.

When the thin layer of ore is processed as hereinafter described in greater detail, liquid is applied to the upper surface and recovered from the bottom after percolating through the layer. This causes some compaction of the thin layer and the thicknesses preferred in practice of this invention relate to the thickness of the ore layer after percolation. The degree of compaction that occurs as the thin layer is leached typically is in the order of about 10 to 25% depending on a variety of factors including particle size, particle size distribution, reaction of the ore to curing in the cure pile, method of spreading ore in the thin layer, and the reaction of the ore to the leaching solution. The rate of application of leach liquid can also have a minor effect. Only a very few experiments are required to find the degree of compaction of a particular ore and the optimum thickness of thin layer for uniform high yield of metal values.

A weak leach solution is sprayed over the surface of the thin layer of ore on the respective leach pad 19. This is indicated in FIG. 1 by a single spray bar 21 over the leach pad, however, it will be appreciated that many sprayers may be needed in a bed of substantial area. The liquid sprayed on to the top surface of the thin layer percolates downwardly therethrough and into the permeable substrate. Typically, in a thin layer as used in practice of this invention, it takes approximately one hour for liquid to precolate through the ore bed. This is ample time for interaction with the bed.

The time required for precolation does not appear to be critical.

The first solution sprayed onto the thin layer of ore on the leach pad is leach liquid effluent from a third stage of leaching mentioned hereafter. This third stage solution is temporarily held in a reservoir 22 to be available for recycling. As the weak leach solution percolates through the thin layer of ore on the leach pad the metal values solubilized during curing are dissolved and appear in the liquid withdrawn from the bottom of the thin layer. This material is passed to a reservoir 23 for temporary storage. Typically, the first leach solution added to the thin layer bed may have about one gram per liter of acid and up to about 2 grams per liter of copper. For the first 15 to 20 hours the effluent leach solution is quite high in metal and low in acid and often can go directly to metal recovery steps without other treatment. Typically, for example, the effluent may average from about 5 to 15 grams per liter of copper in the solution. Pipelines 25 run from beneath the leach pads 19 to the storage reservoirs 22 and 23 for handling effluent. In these and other lines valves, meters and other control and measurement devices are omitted from the drawings since they are conventional and details thereof will be apparent to one skilled in the art.

The rate of application of liquid to the thin layer leach pad during all stages of leaching is in the order of about 0.5 to 3.5 times the weight of ore per day, that is, for example, if there is 1000 tons of ore on a leach pad, about 500 to 3500 tons of leach solution is applied per day. Broad variation of the total leach solution within such a range has remarkably little effect on the total recovery of metal from the ore. The rate at which solutions come in contact with a given weight of ore is much larger than with other percolation leach systems. This is because the amount of solution the thin layer will allow to percolate through is high in comparison to the amount of ore being treated. Much lower rates are present in heap leaching, for example. During all stages of leaching some of the leach solution may be recirculated through the thin layer bed to enhance its metal content.

The use of a thin layer also permits the routing of leach and rinse solutions to be much more flexible and easily controlled to obtain high leaching efficiencies, low reagent consumptions and high quality pregnant leach liquors than are other leaching systems. The high rate of transfer of solutions through the thin layer means that a solution can be recirculated to a much higher degree than in other systems thereby building up the metal content and decreasing the reagent content of the final pregnant solution to a greater degree than is attainable in other systems. This optimizes the solution for subsequent metal recovery steps.

The bulk of excess reagent used in an ore curing step is rinsed from the ore along with the bulk of whatever slimes are due to come from the thin layer in a fairly small volume of the initial solution effluent. In systems where ferric iron is a product of the leaching reaction, it too concentrates in the initial effluent and can be recycled and reused as a reagent in leaching. This initial effluent is sometimes best recycled to the initial mixing step where, with additional strong acid, it is used as the strong solution to initially cure the ore. Effluent thereafter remains high in metal and is lower is reagent content and therefore is more suitable for solvent extraction or other recovery steps.

Further, the counter flow of leach and rinse solutions that are relatively high in reagent content and low in metal content with ore material that is progressively becoming weaker in its metal content is more readily accomplished with thin layer leaching than in other systems. The relatively high amount of solution flow through the thin layer and the leach efficiencies that result from the high degree of contact between the ore and solution make it possible to either thoroughly rinse the ore in the final stage on the leach pad with weak-metal, strong-reagent solutions, or with plain water. Thin layer leaching also permits the use of strong leaching solutions to accomplish secondary leaching of the ore in the thin layer and thereby utilize acids that are built up in metal recovery. Thin layer leaching also permits one to recirculate solutions to concentrate metals and reduce reagent contents in the effluent from the thin layer leaching pad so that they can be withdrawn from the system to metal recovery. Such effluent solutions may be highly concentrated in metal content and have only a moderate level of acid for optimum metal recovery by solvent extraction.

Another technique that is unique to this thin layer leaching technique is to withdraw pregnant solution from the beginning or middle of the secondary leaching cycle on the thin layer leaching pad, recover a portion of the metal values from the solution and then return the partially depleted solution to some portion of the cycle for replenishment of its metal content. This is particularly applicable with the technique for recovering metal from the pregnant solution is a crystallization, electrowinning or solvent extraction technique.

The metal rich solution from the reservoir 23 is passed to a conventional three stage solvent extraction (SX) system 24 as indicated in FIG. 2. In the solvent extraction system the copper rich solution is contacted with an organic phase containing a chelating agent for removing the desired metal. The raffinate is withdrawn from the solvent extraction system by a line 26 and stored in a raffinate reservoir 27. The organic phase passes by a line 28 to a conventional two stage stripping system 29 where the copper is stripped from the organic phase by conventional acid stripping. The aqueous strip solution from the stripping system 29 passes by line 31 to an electrowinning subsystem 32. In the electrowinning system copper or other metal is recovered from the solution by conventional electrolytic techniques. Crystallization of metal salts from the strip solution may be used in lieu of electrowinning if desired. Uranium may be recovered as yellow cake, for example. The organic phase recycles from the stripping subsystem 29 to the solvent extraction system 24 by way of a line 33.

As the metal values in the thinlayer of ore on the leaching pad diminish during leaching, it is preferred to cycle the leaching effluent to the reservoir 22 and proceed to a second stage of leaching. During this second stage, which typically may last 20 to 25 hours, a leach solution is withdrawn from the reservoir 16 at the foot of a tailings pile 36. Alternately, or in addition, the liquid sprayed on the leach pile during this stage of leaching may be solvent extraction raffinate from the raffinate storage tank 27. The raffinate is relatively low in metal content and relatively high in acid. The solution in the reservoir is also lean in metal and may also have low or medium acid content. Typically the acid content of the leach liquid in the latter stage is in the order of about 2 to 6 grams per liter. This liquid is sprayed onto the thin layer of ore in the leach pad and percolates therethrough. The effluent is temporarily stored in the reservoir 22 for subsequent use earlier in the second stage of leaching of another batch of ore. In a typical embodiment this mode of leaching gives a yield of 88 to 98% of the metal values. If desired the final rinsing on the leach pad can be with water to assure that no pregnant leach liquid remains in the ore.

After the second stage of leaching has been conducted with the ore on the leach pad 19 for about two or three days, a front loader or scraper is used to remove the ore to the face of the tailings pile 36. As this material is dumped over the edge of the tailings pile it rolls and slides to form a thin layer of approximately the angle of response of the wetted material. As soon as the thin layer leach pad is cleared it can receive a new thin layer from its respective cure pile.

By having a pair of cure piles and leach pads, reasonably continuous operation can be maintained on a four day cycle. On odd numbered days material is moved in the No. 1 cure pile 18 and leach pad 19. On even numbered days materials are moved in the No. 2 cure pile 18 and leach pad 19. This permits material to remain in the respective cure pile or leach pad for about two days. There is some overlap in the time required for mixing, loading and unloading and a convenient four day cycle is readily achieved. It is found that a four day cycle is nearly optimum for most ores that are acid leached. Two days of curing and two days of rinsing are preferred and thus two sets of curing station and leach pad can be changed on alternate days for effective use of both capital investment and labor. In an embodiment where acid is not the leaching reagent and there is no curing step, the ore may remain on the leaching pad for a week or more and a longer cycle time results.

FIG. 8 illustrates in bar chart form a preferred four day cycle for operating two sets of curing stations and thin layer leach pads respectively. The chart is indicated for an elapsed time of 96 hours which permits about two days of curing and about two days of rinsing in each cure pile and leach pad, respectively. The cycle also permits loading and unloading of the cure piles and leach pads on the same shift each day for optimum arrangement of labor time. Broadly speaking, ore is cured on cure pad No. 1 for two days and then is rinsed on leach pad No. 1 for two days, and is thereafter discharged to a tailings pile. Concurrently and staggered from the process on the first set by one day, ore is cured in cure pile No. 2 for two days, rinsed for two days on leach pad No. 2 and discarded to tailings.

In FIG. 8 certain abbreviations are used to fit the available space. The symbol L indicates loading, or that period of time when solid materials are being loaded into the cure pile or onto the leach pad. The symbol U refers to unloading as solids are removed from the cure pile or leach pad respectively. The symbols R1, R2, and R3 refer to different stages of rinsing material on the leach pads.

As indicated in FIG. 8, which represents a four day period arbitrarily selected during processing rather than at the initiation of processing, about four hours is required to load the No. 1 cure pile. This typically includes crushing of the ore to the desired particle size, mixing it with strong acid and conveying it to the cure pile. This ore remains in the cure pile until about 44 hours after the commencement of the cycle. At that time unloading of the cure pile is commenced with the ore being transferred to the No. 1 leach pad. Thus, as indicated in FIG. 8, loading of the leach pad is concurrent with unloading of the cure pile. As soon as the curing station is available, it is reloaded with another batch of ore.

Meanwhile, during rinse stage R1, the transferred ore in the thin layer on the leach pad is being rinsed for two or three hours, and often at least part of this effluent is mixed with the ore being loaded on to the cure pile No. 1. This first effluent may be relatively high in acid content and contain slimes from the ore being rinsed. It may be recycled to curing or percolated through a thin layer of limestone on a neutralization pad. During the next ten hours or so during rinse stage R2, the ore in the thin layer on the leach pad is rinsed with recycled effluent and the effluent during this stage can go directly to solvent extraction for recovering the valuable metals.

After twelve hours or so, there is a third stage of rinsing, R3, wherein the thin layer is sprayed with lean solution for recovering the last of the metal values. Finally, about 40 hours after the beginning of the above-mentioned cycle, which is repeated every two days, ore is unloaded from the leach pad and conveyed to a tailings pile.

Meanwhile, the same processing steps are occurring in cure pile No. 2 and on leach pad No. 2. It will be noted, however from FIG. 8, that these process steps are staggered 24 hours from the similar operations in the first set of cure pile and leach pad. Thus the unloading and loading operations occur on alternate days in the two sets and such operations can be conducted on the same shift so that workers' schedules are easily arranged. Also it is convenient to use effluent from the R3 stage of leaching on one leach pad as the input rinsing solution for the R1 and R2 stages on the other leach pad.

In some embodiments it is found that two days of curing is appropriate whereas three days of rinsing may be desirable. The process provided herein is quite suitable since two days of leaching can be conducted on the thin layer leach pads and then unloading is to the face of the tailings pile for additional leaching.

Figure 3:
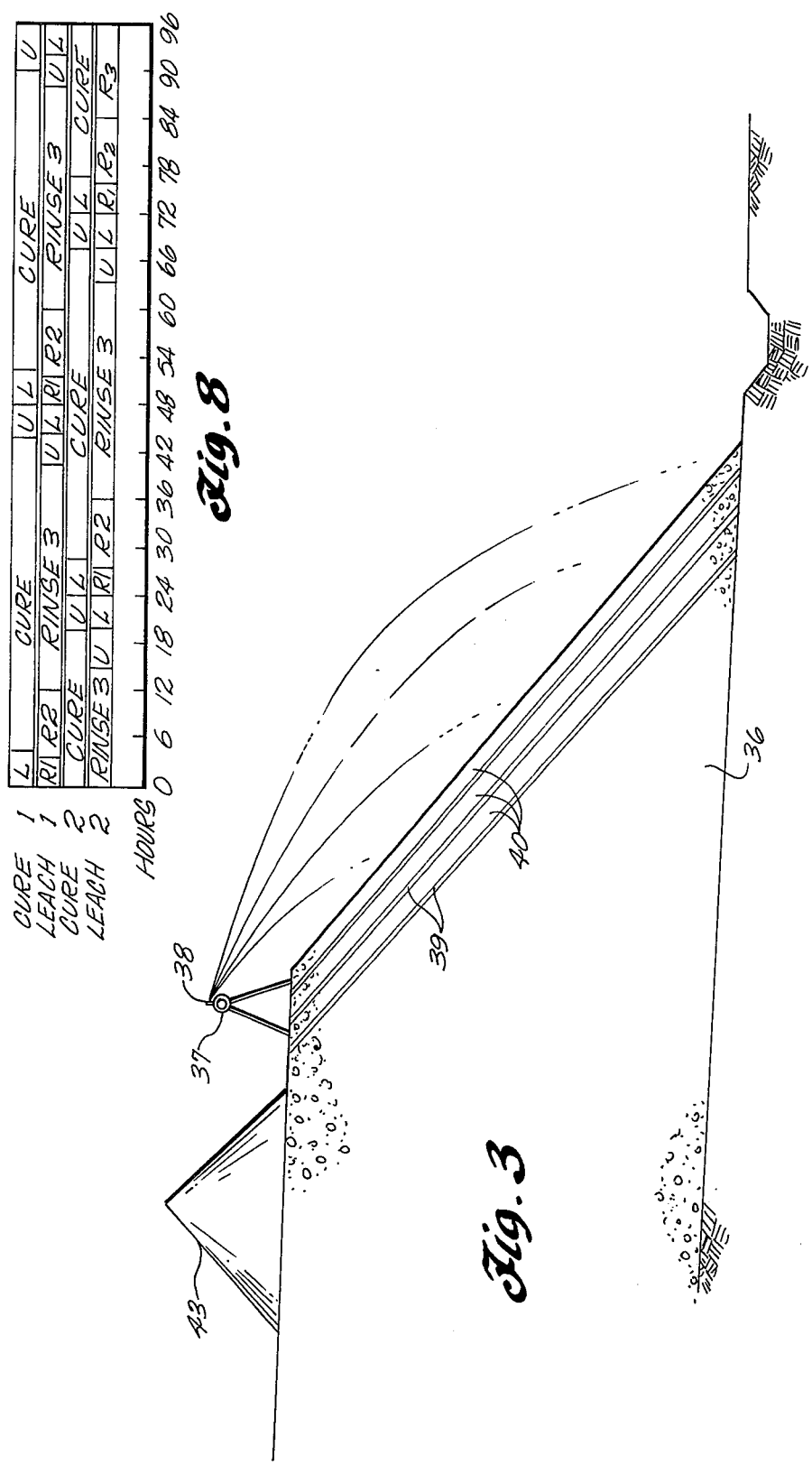
FIG. 3 illustrates in transverse cross section a typical arrangement for leaching a face of a pile.

In such an embodiment the material dumped over the face of the tailings pile is preferably subjected to a third stage of leaching. A line 37, as also seen in FIG. 3 is, therefore, provided at the top of the tailings pile with a number of spray heads 38 arranged to spray leach solution over the advancing face of the pile. Solvent extraction raffinate is sprayed onto the face of the tailings pile, percolates essentially vertically through the thin layer of depleted ore added from the leach pad, and flows from the toe of the pile to the reservoir 16. Typically the solvent extraction raffinate has about 6 grams per liter of acid and very little metal content. The acid in the raffinate leaches any remaining metal values from the thin layer of depleted ore on the face of the tailings pile and enhances the total recovery from the ore by this third stage leach. Thin layer leaching on the face of the tailings pile can increase the yield as much as 10% with significant costs.

When the ore is dumped over the face of the tailings pile from the leach pad there is some inherent size segregation as it rolls and slides down the face of the pile. Further, as leach solution is sprayed on to the face of the pile and it percolates therethrough, there is additional size segregation within the layer in place. This results in stratifaction of the tailings pile in layers dipping at the angle of repose of the material. This stratification results in relatively narrower strata 39 having enhanced permeability and thicker strata 40 of lesser permeability in each thin layer added to the face of the tailings pile. As a result liquid can flow more readily in the tailings pile in a direction along the strata as compared with flow through the strata.

The result is that leach solution sprayed on the face of the tailings pile generally percolates approximately vertically downwardly through the most recent thin layer 40 added to the face. The general trend of percolation thereafter is along the more permeable strata 39 until the liquid emerges from the toe of the tailings pile. There is only minimal flow in the main body of the tailings pile and there is, therefore, effective thin layer leaching of the most recently added layer on the face of the tailings pile. This minimizes loss of metals by re-crystallization and assures substantially uniform thin layer leaching of all the material as it is added to the face of the tailings pile, thereby assuring that maximum yield from the ore is obtained.

FIG. 2 indicates another embodiment of practice of this In such an arrangement, ore, either directly from a mine or from the crusher 10 is conveyed to the face of a tailings pile 36 where it is dumped as a thin layer on the face of the pile and assumes the natural angle of response. In such an arrangement leach liquid applied to the thin layer of ore on the face of the pile leaches metal values therefrom in the same manner as described for leaching the partly depleted ore from the leach pads. Such an arrangement is suitable for low grade ores where high volumes must be handled and provision of separate leach pads is relatively expensive. In such an embodiment initial leaching can be by one leach solution and final leaching by a second leach solution to optimize total yield. If the ore is crushed before placing on the face of the pile, yields as high as 90% may be obtained. Without crushing, yields of 50% of the metal values may be obtained, depending on the run-of-mine size distribution of the ore.

If desired, as indicated in FIG. 3, ore can be mixed with a strong leach solution and left in a pile 43 on the top of the tailings pile for curing in a manner as hereinabove described. This enhances the permeability and leachability of the ore. After it has cured for a sufficient time such ore can be plowed over the face of the tailings pile for leaching.

Another alternative is for recovery of metal values from an existing tailings pile or the like. In such an embodiment the face of the tailings pile is sprayed with a leach solution and the effluent is recovered from the toe of the pile. Resistance to flow of liquid increases with depth in the pile and an appreciable portion of the leach solution flows only through the thin layer on the exposed face of the pile. After this thin layer has been sufficiently leached, the depleted rock is removed, thereby exposing a new portion of the tailings pile having a face lying approximately at the angle of response. This new thin layer is then leached and the process continued as the tailings pile retreats. If any pregnant solution flows into the main volume of the pile behind the thin layer on the face, metal values are recovered as the pile retreats and the only losses are into the local ground water.

If desired, the permeability of the thin layer on the face of a retreating pile can be enhanced by raking or the like before the liquid is sprayed thereon to increase its permeability relative to the permeability of the compacted material further down in the tailings pile. If raked with a ripper, a strong solution is readily injected by nozzles on the ripper teeth. This distributes the solution uniformly for curing. Strong solution can also be applied by sprinkling with just enough liquid to wet the thin layer on the face of the pile. The wetted thin layer is permitted to cure for a couple of days before rinsing with weak solution. Thus, thin layer leaching on the face of a pile at approximately the angle of repose can be performed with either an advancing or retreating pile. Such face of the pile leaching is advantageous since it can be used on uncrushed ore.

In some embodiments it may be desirable to combine thin layer leaching of low grade uncured ore with the thin layer leaching on pads hereinabove described. In some leaching cycles iron builds up in the system and there may be an excess of acid over the acid demand for leaching the ore. Solutions containing such materials and stripped of copper, zinc and other valuable metals can be used for thin layer leaching of such low grade ore on the face of a tailings pile.

Thus, for example, relativey low grade ore having less than about 0.2% copper may be crushed and placed on the face of a pile in a thin layer less than about one meter thick. Solvent extraction raffinate sprayed over such a thin layer loses iron and acid, and valuable copper and zinc leached from the low grade ore appear in the effluent at the toe of the pile. In a typical embodiment wherein about 2,500 tons per day of copper ore is treated in cure piles and leaching pads, an additional 1000 to 2000 tons per day of low grade ore can be treated with excess iron and acid solutions from the main thin layer leaching circuit to recover additional copper and zinc.

In some ore bodies the first effluent from such a thin layer is high in zinc concentration and is essentially free of copper, iron and acid. This enables separation of part of the zinc from copper on a quite economical basis. Copper bearing solutions appear thereafter and may be treated directly for copper recovery or used in the main thin layer leaching circuit for the second stage of leaching. Such an embodiment using thin layer leaching of low grade ore can be used with two stage thin layer leaching on pads as hereinabove described, or with an embodiment having a third stage of leaching of depleted ore from the leaching pads on the face of a tailings pile.

In another embodiment not specifically illustrated herein, thin layer leaching may be conducted on the top or essentially horizontal surface of a tailings pile or heap that is considerably thicker than such a thin layer. Such an arrangement can be used with either an increasing or decreasing pile.

In an embodiment where the pile is increasing a thin layer of ore is spread on the horizontal surface of the pile and sprayed with a weak leach solution. Preferably the ore is first mixed with a strong leach solution and permitted to cure either in piles or in the thin layer before the weak leach solution is applied. The thin layer may also comprise ore removed from a thin layer leach pad as hereinabove described which is spread on the top of a tailings pile growing in height and there subjected to a third stage of leaching in the same manner as a thin layer spread on the face of an advancing tailings pile. The leach liquid applied to the thin layer at the top of the pile leaches metal values therefrom and then percolates through the main body of the pile beneath the thin layer. Since the thin layer is applied in a thickness of less than about one meter it is subject to only minor compaction, if at all, and the yield of metal values therefrom is quite high. This pregnant solution percolates through the balance of the tailings pile and is recovered at its toe. Channelling in this compacted portion of the tailings pile is apparently not a problem and there is little loss of metal values due to crystallization. This is apparently due to the fact that the pregnant solutions are relatively dilute. After each thin layer is leached it is covered by another as the pile gradually grows in height.

Preferably such a tailings pile to which thin layers are successively added and leached is formed on an impermeable substrate so that losses to ground water are avoided. If desired, the impermeable substrate may be covered with a layer of coarse ore or gravel to have enhanced permeability and assist in recovering leach liquid from the body of the pile.

Good recovery can also be obtained from a decreasing tailings pile being leached for metal values ignored or lost in the primary recovery that led to formation of the tailings pile. Optimum yields may not be obtained in such an embodiment since there is ordinarily little opportunity for control of particle size. It is preferred to rip the top thin layer or otherwise "fluff it up" so that it has a relatively high permeability. This destroys the compaction of the top thin layer that is present after being packed beneath successive layers in a tailings pile. In the course of ripping, it is also desirable to inject a strong leaching solution into the top thin layer so that it can cure before being subjected to rinsing. Spray jets on the ripper teeth can be used for injecting strong leach solution, or such solution can be applied as the top thin layer of material is broken up and mixed. Often the top thin layer has an appreciable liquid content due to previous processing and the liquid applied may be extremely strong acid.

After permitting the top thin layer to cure it is sprayed with a weak leach solution which percolates therethrough and recovers metal values. The leach liquid then percolates through the balance of the tailings pile from which it is recovered at the toe. After the top thin layer, a meter or less thick, has been adequately leached, it is scraped off and removed and the next thin layer treated in the same manner. By gradually decreasing the size of the tailings pile losses of pregnant solution in the pile are essentially avoided since they are removed in subsequent thin layer leaching. The only leach liquid losses are then into ground water and in many cases this can be minimized by withdrawing process water from aquifers upstream from the tailings pile and recovering leach liquid from a portion of the aquifer at the foot of the tailings pile. Many tailings piles suitable for practice of this invention are formed on essentially impermeable substrates so that liquid losses are minimal.

FIGS. 1 and 2 also illustrate an optional feature which may be used in practice of this invention. For best extraction in a solvent extraction system and acid content of the aqueous solution from which metal is to be extracted is preferably as low as feasible. Typically the effluent from the thin layer leaching pad may have as much as one gram per liter of acid, and it is often desirable to remove or neutralize this acidity. A third thin layer pad 41 is therefore provided. A thin layer (as herein defined) of crushed limestone is provided on this neutralization pad. When it is desired to lower the acid content of leach effluent it is sprayed over the thin layer of limestone from spray bars 42 indicated schematically in FIG. 1. The liquid percolates through the thin layer of crushed limestone in the same manner as hereinabove described and acid reacts therewith for neutralization. The effluent from such a thin layer neutralization pad is suitable for solvent extraction feed.

The thin layer on the neutralization pad can also be coarsely crushed material containing iron oxide. This material neutralizes acid and also adds ferric sulfate to the solution which can be quite advantageous in leaching some sulfide ores. Neutralization of acid can be by any of a variety of materials such as dolomite or calcereous ore. If neutralization alone is desired, it is preferred that the product of reaction (e.g., calcium sulfate) is substantially insoluble in the effluent.

Clearly, a thin layer neutralization pad containing a bed of crushed limestone, dolomite, calcereous ore, or the like has applications in embodiments other than an ore leaching facility. Such a thin layer pad makes optimum use of the limestone since channelling and other non-uniform liquid to solid contact is avoided. It will also be apparent that if desired thin layer neutralization with limestone dumped on a pile at its angle of repose can also be usefully employed.

Figure 4:
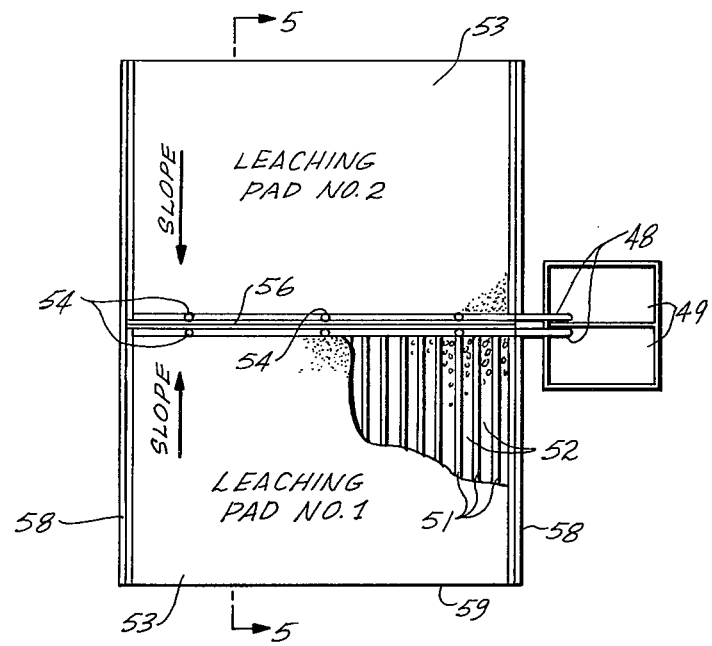
FIG. 4 is a top view of an exemplary pair of leaching pads useful in practice of this invention.
Figure 5:
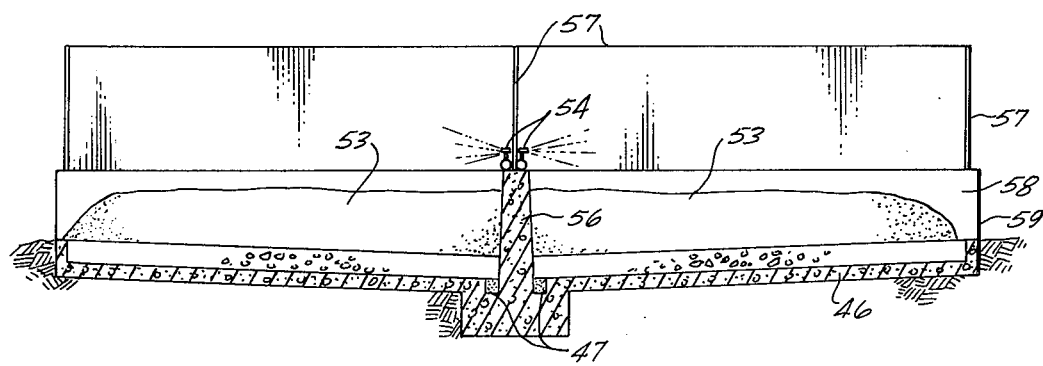
FIG. 5 is a transverse cross section through the leaching pads of FIG. 4.

FIGS. 4 and 5 indicate in top view and transverse cross section, respectively, a pair of thin layer leaching pads suitable for use in practice of this invention. They are not quite identical to the pads 19 in FIG. 1 but differ therefrom in insignificant details. The leaching pads are formed on a concrete foundation 46 to minimize loss of liquid from the pads. The concrete may be coated with asphalt or an asphalt foundation can be used if desired to provide resistance against leaching solutions. The concrete foundation beneath each pad slopes to a drainage channel 47, each of which connects by a conduit 48 to a respective surge reservoir 49 for collecting effluent liquid. A number of wooden timbers 51 are laid on the concrete foundation with their axes extending down the slope of the floor, either 8 × 8 inches or 12 × 12 inches timbers are suitable. The timbers are spaced apart about 15 to 50 centimeters and the spaces 52 therebetween are filled with coarse gravel. Preferably rounded river gravel is used for greatest permeability.

When the leaching pad is used, a thin layer 53 of ore is spread over the gravel and timber substrate. As mentioned above this layer is preferably about one-half to one meter thick. Sprays of leaching liquid from spray heads 54 on a center wall 56 fall on the top of the thin layer of ore 53. Dividing and surrounding partitions 57 confine the spray to the desired areas. The leaching solution percolates down through the thin layer of ore and into the gravel between the timbers. It then flows along the slope of the pad floor to the collection channels 47. A slope of only one or two degrees is sufficient for a thin layer leaching pad.

After a leaching cycle is completed, a rubber tired scraper or end loader removes the ore from the leaching pad. Although concrete walls 58 may be desired at the ends it is preferred to leave at least one side 59 of the pad open so that such earth moving equipment can readily add or remove ore from the pad. The rubber tired loader essentially rides on the timbers and its blade removes the ore above the timbers. A minor amount of the first thin layer of ore sifts into the top of the gravel pack between the timbers but that is of minor consequence in the permeability of the gravel. Ore is readily removed down to the tops of the timbers without disturbing the underlying gravel layer. Such a high permeability substrate formed of timbers and gravel can be used for long periods before repacking.

Rather than use timbers for such a permeable substrate, the leach pad can be made with concrete corrugations with gravel in the low portions and the tops serving to guide spreaders during removal of ore from the pad. Grates over trenches formed in a concrete substrate can also be employed.

As hereinabove described it is sometimes desirable to neutralize acid in effluent from the leaching pads. The high permeability substrate described and illustrated in FIGS. 4 and 5 provides an opportunity for such neutralization without a separate neutralization pad as provided in FIGS. 1 and 2. Thus, instead of using inert gravel between the timbers of the leaching pad, the spaces can be filled with relatively coarsely crushed limestone. Such material can have the dual function of providing a high permeability substrate and at least partly neutralizing acid in effluent from the thin layer being leached.

Figure 6:
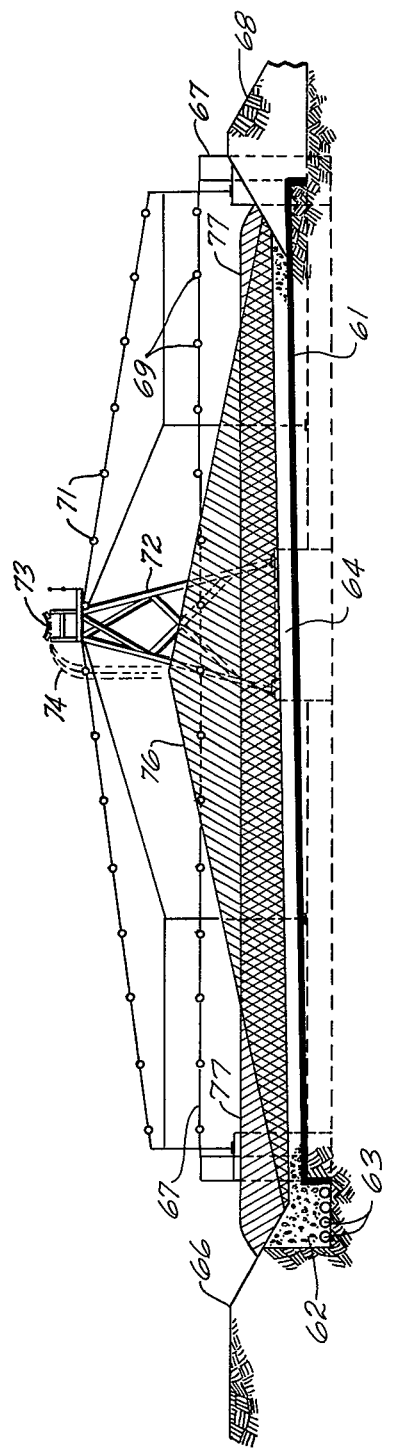
FIG. 6 illustrates in semi-schematic cross section another leaching arrangement for practice of this invention.

FIG. 6 illustrates a modified embodiment of thin layer leaching technique for practice of this invention. As illustrated in this embodiment, the thin layer leaching pad illustrated in transverse cross section is formed on an earthen substrate. A thick layer of asphalt 61 is provided over the earth to seal the bottom of the leaching pad. The asphalt layer slopes to a trench 62 containing perforated pipes 63 to serve as solution collection headers. A permeable drainage field 64, such as the timber and gravel pad, is provided over the asphalt layer. One edge of the leaching pad is defined by a natural earth berm 66 and two sides have a concrete retaining wall 67. The fourth, uphill, side of the thin layer leaching pad is at least partly closed by a packed berm 68 of tailings or the like. This permits removal of the tailings berm for access to the thin layer for removal after leaching.

A series of spray heads 69 are provided on the end walls 67 for spraying liquid over the thin layer of ore thereon. Additional spray heads 71 are provided on a superstructure over mid-portions of the leach pad as required to obtain uniform liquid distribution. A truss structure 72 supports a conveyor belt 73 from which ore can be plowed as suggested by the dotted lines 74.

When the leach pad is used, ore wetted with a strong leach solution is plowed off of the conveyor belt 73 into a conical pile or piles 76 on the leach pad as indicated by the left dipping cross hatch lines. The ore may remain in this pile for curing for two days, for example, and it is then spread into a thin layer 77 as indicated by the right dipping cross hatching in FIG. 5. Leach solution is then applied in the same general manner as hereinabove described from the spray heads 69 and 71. The leach solution percolates down through the thin layer into the permeable drainage field 64. The liquid flows laterally to the collection trench 62 where it is recovered.

If desired, ore can be spread on a leach pad as illustrated in FIG. 6 by earthmoving equipment other than the conveyor structure illustrated. This ore can be placed on the pad and thereafter contacted with a strong leach solution for curing. A suitable way of injecting such leach solution is by a plow or series of plows having liquid injection jets that distribute strong leach solution in the ore as it is raked by the plows. This is preferable to applying strong leach liquid to the thin layer surface since more uniform distribution is obtained and non-uniform curing is avoided. Such an arrangement may be used in lieu of an embodiment having a mixing drum or the like.

Figure 7:
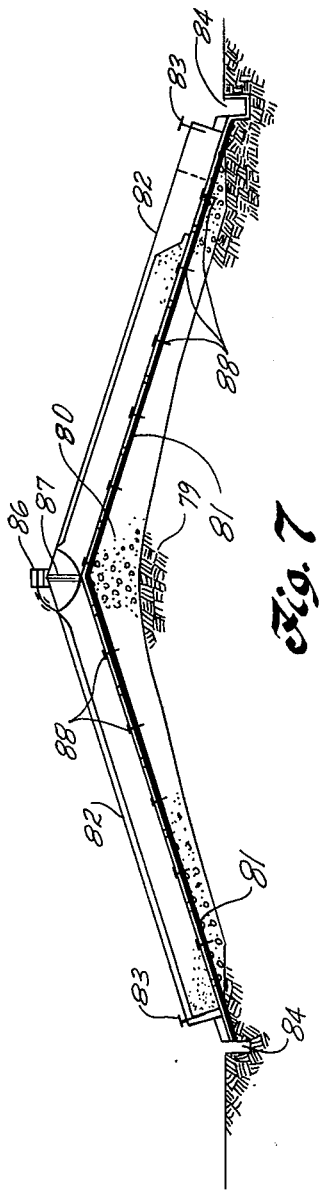
FIG.7 illustrates in transverse cross section another leaching arrangement for practice of this invention.

FIG. 7 illustrates another embodiment of thin layer leaching wherein the layer is approximately at the angle of repose of the material being leached. As illustrated in this embodiment a mound of earth 79 is topped with a layer of concrete 80 or packed fill sealed with an asphalt layer 81. This substrate has a slope extending each way from its center line at approximately the angle of repose of material to be leached. The ends of the leach pads are closed by short concrete walls 82. At the toe of each side of the leach pad there is a row of liftable gates 83 which typically have separation chutes (not shown) therebetween for directing ore and liquids towards the gates. The gates are shown in their lower or closed position on the left and in their raised or open position on the right. A collection trench 84 is provided outside each row of gates. A conveyor 86 is provided above the leach pad so that ore can be plowed on to the pad on either side thereof. Typically the two sides are used alternately and a concrete wall 87 may be provided therebetween.

The leach pad is filled as indicated on the left side of FIG. 7 by plowing ore off of the conveyor belt and permitting it to slide and roll down the sloping face. As mentioned above, such loading at the top of a slope at approximately the angle of repose causes some size segregation. Relatively coarser material initially travels further down the slope to form the lowermost portion of the layer. Finer materials accumulate on top so that the permeability of the thin layer formed on the pad is greatest near the bottom surface. Permeability of the bottom stratum can be enhanced, if desired, by initially spreading a coarse layer on the pad. If desired after loading, the upper surface of the thin layer can be raked to assure more uniform layer thickness.

After spreading the thin layer on the sloping leach pad, leach solution is sprinkled on the surface in the same general manner as hereinabove described. This leach liquid percolates almost vertically downwardly through the principal portion of the bed of ore on the pad. As it reaches the bottom of the thin layer, principal flow becomes lateral in the more permeable bottom stratum and eventually the liquid flows from the toe of the thin layer to the collection trench 84.

After leaching has been completed, the gates 83 at the toe are raised as indicated on the right of FIG. 7. This permits ore to flow from the leach pad into the collection trench where it can be flushed away. Rather poor flow of the wet material from the leach pad can be expected. A plurality of water jets 88 are, therefore, provided in the floor of the leach pad. By progressively activating these, commencing at the lower end of the slope, the overlying ore is washed down and into the removal trench 84. Thus, in such an arrangement the ore is essentially spread automatically into a thin layer for leaching and at the end of the leaching cycle is readily removed without mechanical equipment. If desired, rather than having jets in the floor of the pad, water jets can be directed onto the pad from above for hydraulically removing the depleted ore from the pad.

Following are a few typical examples of practice of this invention on various ores.

EXAMPLE I

An oxide-sulfide copper ore from Fierro, New Mexico, was leached in accordance with principles of this invention. This ore has approximately 0.7% total copper and about 0.5% present in the form of oxide copper. The ore contains a relatively high proportion of sulfides and iron oxide slimes and therefore has low inherent permeability. About 150 tons of uncrushed ore was spread on a porous substrate in a thin layer about 40 centimeters thick. This layer was sprinkled with a strong sulfuric acid solution and permitted to cure for about 1.5 days. The ore was then rinsed with weak acid solutions for about one day to remove the metal values. About 95% of the oxide copper and about 30% of the sulfide copper can be dissolved and rinsed from this ore with a sulfuric acid consumption of about 6 to 11 kilograms of acid per kilogram of copper recovered.

EXAMPLE II

In another test on an oxide copper ore having about 1.2% copper from near Tyrone, New Mexico, the ore was crushed to less than about 10 centimeters. This crushed ore was mixed with a sufficient quantity of strong sulfuric acid to be damp without a noticeable liquid phase. The ore was formed in a thin layer about 1.2 meters thick and permitted to cure in place for about two days. The thin layer was then rinsed by downward percolation with weak leaching solutions for about two days. After percolation the thin layer was about 1.1 meters thick. The yield of total contained copper was about 97.5% and the acid consumption was about 7 kilograms of sulfuric acid per kilogram of copper recovered. In this test about 65% of the dissolved copper was recovered as a first stage leaching effluent containing 22.7 grams per liter of copper, 4.8 grams per liter total iron, 0.82 grams per liter ferrous iron, and less than about 5 grams per liter sulfuric acid.

EXAMPLE III

Tests with ore from a portion of the Korn Kob Mine near Tucson, Arizona, having an average of about 0.36% oxide copper showed the following processing parameters to be suitable:

a. The ore is crushed to about $-12$ millimeters and mixed with about 4.5 to 5% by weight of strong sulfuric acid to give a dampened ore mixture with about 10 to 11% total moisture content.

b. The ore is then permitted to sit in a cure pile for an average of about 44 hours.

c. The cured ore is then spread on a leaching pad in a thin layer about 85 centimeters thick (initially before any rinsing).

d. The thin layer is then rinsed with weak acid and copper solution from step (g) from a previous batch of ore being treated.

e. The rinse effluent for approximately the first three hours is relatively high in acid, soluble iron and copper. This effluent goes to a small auxiliary neutralizing pad having a thin layer of low grade ore or calcareous rock to remove the excess acid and some of the ferric iron from the solution.

f. The solution from the neutralizing pad along with the leaching pad effluent that discharges from the leaching pad in the next nine to 21 hours is temporarily stored in a solvent extraction feed solution reservoir until metal values can be removed therefrom by conventional solvent extraction.

g. The rinse solution percolated through the thin layer on the leaching pad is then changed from weak acid solution to raffinate from solvent extraction which typically contains about six grams per liter sulfuric acid and low copper content. The effluent from the leaching pads during the last 20 to 28 hours of the leaching cycle is preferably sent to a "face to the heap" thin layer leach of low grade ores.

h. Low grade ore is spread in a thin layer on the the face of a tailings pile, preferably in an arrangement that permits effluent from different portions of the face to be separately recovered. Effluent from step (g) is sprayed onto the face of the heap to percolate through the thin layer of low grade ore. The first effluent is a solution high in zinc and almost free of iron, copper acid. About 45% of the zinc can be recovered from this first effluent in a single solvent extraction stage. About 80 to 95 of the total zinc is ordinarily recovered.

i. Effluent from step (h), after the initial zinc extraction, is recycled to steps (a) and (d) as required. Any excess is mixed with effluent solutions of steps (e) and (f) to form a low acid and iron and high copper content solution for solution extraction processing.

j. Spent tailings are removed from leaching pad and discarded at the end of the rinsing cycle which lasts about 40 hours.

Copper yields of from about 85 to 108 of the oxide copper content of the ore (some of the copper is from the sulfide copper in the ore) can be obtained. Further in a 2500 ton per day thin layer leaching process an additional 1000 to 2000 tons per day of low grade ore can be treated with excess iron and acid bearing solutions from the main thin layer leaching circuit to recover additional copper and zinc. Such additional treatment of low grade ore not only recovers additional metal values but prevents buildup of deleterious iron in the leaching circuit.

EXAMPLE IV

Tests were made on uranium ore samples from part of Anderson Mine near Wickenberg, Arizona. One of the samples was crushed to less than about 12 millimeters. This sample had about 0.06 $U_3O_8$. The sample was cured for two days after being wetted with 29% sulfuric acid solution with a total quantity of about 5% sulfuric acid in the ore. The total moisture content was about 17%. The sample was formed in a thin layer about 1.45 meters thick. A relatively thick layer was feasible since the crushed ore has a very low bulk density of about 1100 kg/cm$^3$ (67 lb/ft$^3$). About 93.6% of this uranium was recovered in two days of rinsing the thin layer. After rinsing the thickness of the thin layer was about 1.3 meters.

Another sample was crushed to less than about 10 millimeters and was formed in a thin layer about 1.1 meters thick. It was cured in place in the layer in the same manner as the first sample. After rinsing the layer was about one meter thick. This material 0.10% $U_3O_8$ and a yield of 97.8% was obtained. Both of these samples had almost as much $V_2O_5$ as $U_3O_8$ and about 40% of this material was dissolved with the uranium. The vanadium can be either discarded or recovered as a separate product.

EXAMPLE V

Tests were run on Chingola copper ore samples from Zambia. This ore is very friable and copper is present as cupriferous mica which occurs in a very fine friable fraction. The samples were $-10$ mesh and were therefore not suitable for normal thin layer leaching. One part of this fine material was mixed with two parts of barren rock crushed to less than about 12 millimeters and screened to larger than 14 mesh. The mixed solid sample was mixed with about 8.5% by weight of moisture having an equivalent of about 7.5% sulfuric acid and 0.75% ferric sulfate in the solution relative to the ore. The mixture was then cured for 44 hours and rinsed in a thin layer for one and one-half days. A rinse solution containing about 5 grams per liter sulfuric acid and about 0.56 grams per liter ferric ion having a flow rate of about 300 liters per square meter of thin layer surface per day was used. A yield of 88.4% was obtained. Agitation leach tests of the same ore showed a yield of 74.9%. Acid consumption in the latter test was about 24% less than in the thin layer leaching, but no account was made for acid recirculation in the thin layer leaching.

In another test on the same material, one part of the fine ore was mixed with 2.5 parts of coarse barren rock. This mixture was wetted with about 8% moisture content containing the equivalent of 3.75% sulfuric acid and 0.75% ferric sulfate relative to the ore. The material was cured for two days and then rinsed in a thin layer for one and ½ days. The same rinse solution composition was used and the solution flow rate was about 235 liters per square meter per day. A yield of about 84.7% of the copper was obtained in this test. Agitation leach tests on this sample showed a yield of 81.5% with about 29% less acid consumption.

EXAMPLE VI

Ore from the Loretto mine near Big Pine, California, is advantageously leached in a thin layer with a permeable limestone substrate. This ore averages about 2-½ to 3% copper in the form of oxides. Such material is dampened with strong leaching solution containing sulfuric acid and cured for about two days. It is then spread in a thin layer about ⅔ meter thick on a leach pad for rinsing. The leach pad has a layer of coarsely crushed limestone to provide a permeable substrate. After rinsing on the leach pad, the ore is dumped as a thin layer on the face of a tailings pile where it undergoes additional leaching.

The relatively depleted ore on the face of the tailings pile is sprayed with raffinate from solvent extraction. This material contains about seven grams per liter of sulfuric acid and very little copper. The effluent from the face of the heap leaching contains about 3 grams per liter of acid and about 1 gram per liter cooper. This effluent is sprayed on the cured ore on the leach pad. At the bottom of the thin layer of ore the effluent has about 5 grams per liter copper and about 1 gram per liter acid. Thereafter, this material percolates through the limestone substrate of the leach pad. This effluent continues to have about 5 grams per liter copper, but because of the neutralization has extremely low acid content. Typically, for example, the pH of the effluent after percolation through the limestone substrate is about 2.2 to 2.3, which corresponds to an acid content in the order of about 0.08 grams per liter. The effluent from the leach pad having a limestone substrate goes directly to solvent extraction where the copper is removed. Highly effective solvent extraction is obtained with such neutralized effluent since the copper concentration is high and the acid concentration is low.

Although limited embodiments of technique for thin layer leaching have been described and illustrated herein many modifications and variations will be apparent to one skilled in the art. For example, in portions the description has employed examples from acid leaching of oxide copper ore. The tehniques are readily adaptable to acid, acid-ferric sulfate, or acid-ferric chloride leaching of oxide and sulfide ores of copper, cabonate, carbonate-bicarbonate, or acid leaching of uranium ores; cyanide leaching of silver or gold ores; chloride leaching of lead or zinc ores, sodium hydroxide or acid leaching of aluminum ores and many others. Adaptations of the reagents, cycle times, and the like for such variations will be apparent to one skilled in the art.

If desired the curing step can be conducted at elevated temperature instead of at the ambient temperatures achieved during curing. It will be noted that the ordinary evolution of heat as the ore cures in a pile may raise the temperature appreciably, thereby enhancing the curing effect. This is more pronounced in a pile than when the ore is spread into a thin layer since a pile (or ore contained in a silo) has less surface from which to lose heat and higher temperatures are attained. If desired, steam heating, or the like, of the ore can be practiced for shortening the curing cycle. Similarly in an embodiment where relatively coarse inert material is added to relatively fine ore, the coarse material may be preheated before addition to maintain an elevated temperature in the mixed material. Other variations include steam heating of the thin layer on the leaching pad and lateral flow of low voltage electricity through the thin layer to increase reaction rates. In such an embodiment electrical connections to the thin layer are made by way of the end walls of the thin layer leaching pad.

It is therefore to be understood that within the scope of the appended claims the invention may be practiced otherwise than specifically described.

What is claimed is:

1. A method for leaching material values from particles comprising the steps of:
   forming a thin layer of particles having more than about 25% by weight particles larger than about 4 mesh, the thickness of the layer being less than about one and ½ meters; and
   percolating a leach liquid downwardly through the layer.

2. A method as defined in claim 1 wherein the layer is formed on a permeable substrate.

3. A method as defined in claim 1 wherein the forming step comprises forming a thin layer having a thickness greater than about one-half meter.

4. A method as defined in claim 3 wherein the step of forming a layer comprises spreading the particles on a substrate having a slope of approximately the angle of repose of the particles.

5. A method as claimed in claim 4 further comprising the steps of:
   forming a second layer of ore particles over the first formed layer after the percolating step; and
   percolating a leach liquid downwardly through the second layer.

6. A method as defined in claim 4 wherein the step of forming comprises increasing the permeability of a thin layer on the face of a pile resting at the angle of repose and further comprising:
   removing the first thin layer after the percolating step;
   increasing the permeability of a second thin layer at the angle of repose beneath the position of the first thin layer; and percolating a leach liquid downwardly through the second thin layer.

7. A method as defined in claim 3 further comprising the step of contacting the particles with a strong leach solution and curing the so-contacted particles before the percolating step.

8. A method as defined in claim 7 wherein the curing step is performed before the forming step.

9. A method as defined in claim 7 wherein the curing step is conducted for a sufficient time to indurate the particles sufficiently to withstand spreading in a layer in the range of from about one-half to one meter thick without substantial compaction.

10. A method as defined in claim 3 further comprising, before the forming step, the step of forming a mixture of particles by mixing relatively fine particles with a sufficient quantity of coarse particles so that the resulting mixture has more than about 25% by weight particles larger than about 4 mesh.

11. A method as defined in claim 10 wherein the relatively fine particles are a metal bearing ore to be leached and the relatively coarse particles are essentially inert to the leach liquid.

12. A method as defined in claim 1 wherein the percolating step comprises percolating a weight of leach liquid at a rate in the range of from about 0.5 to 3.5 times the weight of the particles per day.

13. A method as defined in claim 1 wherein the percolating step comprises recirculating at least a portion of the effluent leach liquid and repercolating it through the thin layer.

14. A method for reacting a reagent in solution with particles of solids comprising the steps of:
   forming a layer of particles subject to compaction under their own weight having a thickness in the range of from about one-half to one and ½ meters, the layer having a sufficiently small thickness that the permeability of the bottom of the layer is not appreciably less than the permeability of the top of the layer;
   applying a solution containing reagent to the top of the layer;
   percolating the solution downwardly through the layer; and
   withdrawing the solution from the bottom of the layer.

15. A method as defined in claim 14 wherein the forming step comprises forming a thin layer of particles having more than about 25% by weight particles larger than about 4 mesh.

16. A method as defined in claim 14 wherein the step of forming a layer comprises spreading the particles on a substrate having a slope of approximately the angle of repose of the particles.

17. A method as defined in claim 14 wherein the forming step comprises ripping a thin layer of particles on a pre-existing bed of particles for enhancing the permeability of the thin layer and further comprising:
   removing the thin layer after the percolating step;
   ripping a second layer beneath the position of the first layer for enhancing its permeability; and
   percolating a solution containing reagent through the second layer.

18. A method as defined in claim 17 wherein the layers are formed on the face of a pile at approximately the angle of repose.

19. A method as defined in claim 17 wherein the layer is formed on an approximately horizontal top of a pre-existing bed of particles.

20. A method as defined in claim 14 further comprising the step of contacting the particles with a strong leach solution and curing the so-contacted particles before the forming step for a sufficient time to indurate the particles sufficiently to withstand spreading in a layer in the range of from about one-half to one and ½ meters thick without substantial compaction.

21. A method as defined in claim 14 wherein the particles comprise an ore containing metal values and the solution contains a reagent for leaching the metal values from the ore.

22. A method for reacting a reagent in solution with particles of solids comprising the steps of:
   mixing relatively fine particles of metal bearing ore to be leached with relatively coarse particles essentially inert to the reagent in sufficient quantities that the resulting mixture has more than about 25% by weight particles larger than about 4 mesh;
   forming a layer of particles subject to compaction under their own weight, the layer having a sufficiently small thickness that the permeability of the bottom of the layer is not appreciably less than the permeability of the top of the layer;
   applying a solution containing reagent to the top of the layer;
   percolating the solution downwardly through the layer; and
   withdrawing the solution from the bottom of the layer.

23. A method as defined in claim 22 wherein the thin layer has a thickness in order of about ½ to one meter.

24. A method for neutralizing an acidic solution with particles of solids comprising the steps of:
   forming a layer of particles subject to compaction under their own weight, the layer having a sufficiently small thickness that the permeability of the bottom of the layer is not appreciably less than the permeability of the top of the layer, the particles being selected from the group consisting of limestone, dolomite, calcareous rock and rock containing iron oxide;
   applying the acidic solution to the top of the layer;
   percolating the solution downwardly through the layer; and
   withdrawing the neutralized solution from the bottom of the layer.

25. A process for operating a leaching plant having first and second curing stations and first and second leach pads comprising the steps of:
   leaching a first batch of ore in a thin layer on the first leach pad for first and second days;
   curing a second batch of ore in the first curing station for the first and second days;
   leaching a third batch of ore in a thin layer on the second leach pad for the second day and a third day;
   curing a fourth batch of ore in the second curing station for the second and third days;
   leaching the second batch of ore in a thin layer on the first leach pad for the third day and a fourth day;
   curing a fifth batch of ore in the first leaching station for the third and fourth days; and
   continuing the leaching and curing steps in the first and second sets of curing station and leach pad, respectively, on alternating pairs of days.

26. A process as defined in claim 25 further comprising the steps of:
  cycling at least a portion of effluent from the second day of each leaching step as leach solution input on the first day of a concurrent leaching step on the other leach pad.

27. A process as defined in claim 25 further comprising the step of:
  leaching each batch of ore in a thin layer on the face of a tailings pile after its respective leaching step on the leach pad.

28. A method of leaching metal values from ore comprising the steps of:
  mixing a first batch of ore with a strong leaching solution;
  curing the first batch of ore in a first curing station for about two days;
  mixing a second batch of ore with a strong leaching solution about a day after the first mixing step;
  curing the second batch of ore in a second curing station for about two days;
  spreading the first batch of ore in a thin layer in a first leach pad about a day after the second mixing step;
  mixing a third batch of ore with a strong leaching solution about one day after the second mixing step;
  curing the third batch of ore in the first curing station for about two days;
  leaching the first batch of ore for about two days concurrent with the third curing step by percolating leach solution therethrough;
  spreading the second batch of ore in a thin layer on a second leach pad about a day after the third mixing step;
  mixing a fourth batch of ore with a strong leaching solution about one day after the third mixing step;
  curing the fourth batch of ore in the second curing station for about two days;
  leaching the second batch of ore for about two days concurrent with the fourth curing step by percolating leach solution therethrough; and
  repeating the steps on alternate days for the first curing station and leach pad and for the second curing station and leach pad, respectively.

29. A process as defined in claim 28 further comprising the steps of:
  removing the first batch of ore from the first leach pad at the end of the first mentioned leaching step;
  spreading the first batch of ore in a thin layer on the face of a tailings pile;
  leaching the first batch of ore on the face of the trailings pile for at least about a day by percolating leach solution therethrough.

30. A process as defined in claim 28 further comprising the step of:
  cycling at least a portion of the second day's effluent from the first mentioned leaching step on the first batch of ore as leach solution on the first day of the second mentioned leaching step on the second batch of ore.

31. A method for leaching metal values from particles comprising the steps of:
  forming a thin layer of particles subject to compaction under their own weight;
  introducing a leach liquid to the top surface of the layer;
  percolating the leach liquid downwardly through the layer for leaching metal values therefrom; and
  withdrawing the leach liquid from the bottom surface of the layer; and wherein
  the layer has a thickness greater than about one-half meter and a sufficiently small thickness that the yield of metal values from a portion of the layer adjacent the bottom surface is not appreciably less than the yield of metal values from a portion of the layer adjacent the top surface.

32. A method as defined in claim 31 wherein the forming step comprises forming a thin layer of particles having more than about 25% by weight particles larger than about 4 mesh.

33. A method as defined in claim 31 wherein the thin layer has a thickness in the range of from about ½ to one and ½ meters.

34. A method as defined in claim 31 wherein the step of forming a layer comprises spreading the particles on a substrate having a slope of approximately the angle of repose of the particles.

35. A method as defined in claim 31 further comprising the step of contacting the particles with a strong leach solution and curing the so-contacted particles before the percolating step for a sufficient time to indurate the particles sufficiently to withstand spreading in a layer in the range of from about one-half to one and one-half meters thick without substantial compaction.

36. A method as defined in claim 31 further comprising, before the forming step, mixing relatively fine particles of metal bearing ore to be leached with relatively coarse particles essentially inert to the leaching liquid in sufficient quantities that the resulting mixture has more than about 25% by weight particles larger than about 4 mesh.

37. A method as defined in claim 31 wherein the percolating step comprises percolating a weight of leach liquid at a rate in the range of from about 0.5 to 3.5 times the weight of the particles per day.

38. A method as defined in claim 31 wherein the percolating step comprises recirculating at least a portion of the effluent leach liquid and repercolating it through the thin layer.

39. A method for leaching a solid comprising the steps of:
  forming a thin layer of particles of the solid on a slope approximately at the angle of repose of the particles, the thin layer being less than about one meter thick;
  spraying a leach liquid on the sloping face of the thin layer of particles; and
  recovering leach liquid at the toe of the slope.

40. A method as defined in claim 39 further comprising the steps of:
  intermittently adding thin layers of particles of the solid over the first formed thin layer; and
  spraying a leach liquid on the face of each subsequent thin layer.

41. A method as defined in claim 39 wherein the slope is the face of a pile of similar particles.

42. A method as defined in claim 39 further comprising the steps of:
  removing the thin layer of particles from the slope after the recovering step; and
  repeating the forming, spraying and removing steps with an additional layer of thin particles on the slope.

43. A method as defined in claim 39 wherein the thin layer has a thickness greater than about ½ meter.

44. A method as defined in claim 43 wherein at least about 25% by weight of the particles have a size larger than about 4 mesh.

45. In a process for leaching metal values from an ore the improvement comprising:
mixing relatively coarse inert particles with relatively fine ore; and
percolating leach liquid through the mixed ore and inert particles.

46. A method as defined in claim 45 further comprising the step of removing coarse inert particles from the mixture after the percolating step.

47. In a process as defined in claim 45 the further improvement wherein about ⅔ by weight of the mixture comprises coarse inert particles and about ⅓ comprises relatively fine ore.

48. In a process as defined in claim 45 the further improvement comprising mixing at least 25% by weight of the final mixture of inert particles having a particle size greater than about 4 mesh.

49. In a process as defined in claim 48 the further improvement wherein the percolating step comprises percolating leach liquid through the mixed ore and inert particles in a layer having a thickness in the range of from about one-half to one meter.

50. In a process as defined in claim 45 the further improvement wherein the percolating step comprises percolating leach liquid through the mixed ore and inert particles in a layer having a thickness in the range of from about one-half to one and one-half meters thick.

51. In a process as defined in claim 45 the further improvement comprising, between the mixing and percolating steps, the steps of:
contacting the mixed inert particles and fine ore with a strong leaching solution; and
curing the mixture of coarse inert particles, fine ore and strong leach liquid for a sufficient time to indurate the ore sufficiently to withstand the weight of a layer in the range of from about ½ to one meter thick without substantial compacting.

52. In a process as defined in claim 51 the further improvement wherein the contacting step comprises contacting the mixed coarse inert particles and fine ore with a sufficient quantity of strong leach solution that the total liquid content of the mixture is in the range of from about 8 to 18% by weight.

53. A method for leaching metal values from ore particles comprising the steps of:
contacting the ore particles with a strong leaching solution for a sufficient time to indurate the ore sufficiently to sustain the weight of a layer of ore in the range of from about ½ to one and one-half meter thick without appreciable compacting;
placing the indurated ore particles on a permeable substrate in a layer in the range of from about one-half of one and one-half meter thick; and
percolating liquid down through the layer for leaching metal values from the layer of ore particles.

54. A method as defined in claim 53 wherein the quantity of strong leaching solution is sufficient that the resultant mixture has a total weight of liquid relative to the weight of ore in the range of from about 8 to 18%.

55. A method as defined in claim 53 further comprising the step, preceding the contacting step, of sizing the ore to have more than about 25% by weight particles in excess of about 4 mesh.

56. A method as defined in claim 55 wherein the sizing step comprises mixing relatively fine ore with relatively coarse inert particles in a sufficient quantity that the resultant mixture has more than about 25% by weight of particles greater than about 4 mesh.

57. A method as defined in claim 53 wherein the placing step comprises placing the ore particles on a substrate having a slope approximately the angle of repose of the ore particles.

58. A method for leaching metal values from particles of ore comprising the steps of:
forming a first thin layer of particles of ore;
percolating a first leach solution through the first thin layer and recovering a first effluent;
thereafter percolating a second leach solution through the first thin layer and recovering a second effluent;
forming a second thin layer of particles of ore;
percolating at least a portion of the second effluent through the second thin layer and recovering a third effluent; and
recovering metal values from at least a portion of the first and third effluents.

59. A method as defined in claim 58 further comprising recirculating at least a portion of the second effluent through the first thin layer for enhancing its content of metal values.

60. A method as defined in claim 58 further comprising recirculating at least a portion of the third effluent through the second thin layer for enhancing its content of metal values.

61. A method as defined in claim 58 further comprising:
contacting the particles of ore with a strong leaching solution before the first percolating step;
curing the so-contacted ore before the first percolating step; and
cycling the very first effluent from the first percolating step to the contacting step for a subsequent batch of ore particles.

62. A method as defined in claim 58 wherein the metal values are recovered by solvent extraction to form a raffinate and wherein the second leach solution comprises solvent extraction raffinate.

63. A method as recited in claim 14 wherein during a first period of time the solution applied to the top of the layer comprises a second stage effluent, and the solution withdrawn from the bottom of the layer comprises a first stage effluent; and during a second period of time the solution applied to the top of the layer comprises a solvent extraction raffinate and the solution withdrawn from the bottom of the layer comprises a second stage effluent; and further comprising the step of extracting metal values from the first stage effluent by solvent extraction and producing a solvent extraction raffinate.

64. A method as recited in claim 1 wherein during a first period of time the leach liquid percolated through the layer comprises a second stage effluent and liquid withdrawn from the bottom of the layer comprises a first stage effluent; and during a second period of time the leach liquid percolated through the layer comprises a solvent extraction raffinate and liquid withdrawn from the bottom of the layer comprises a second stage effluent; and further comprising the stop of extracting metal values from the first stage effluent by solvent extraction and producing a solvent extraction raffinate.

* * * * *

UNITED STATES PATENT OFFICE
CERTIFICATE OF CORRECTION

Patent No. 4,017,309  Dated April 12, 1977

Inventor(s) Paul H. Johnson

It is certified that error appears in the above-identified patent and that said Letters Patent are hereby corrected as shown below:

Abstract, Line 5, "curling" should be -- curing --.

Column 4, Line 8, "bed" should be -- beds --.

Column 7, Line 61, "of" should be -- or --.

Column 10, Line 30, "with" should be -- when --.

Column 11, Line 15, "response" should be -- repose --.

Column 11, Line 50, "discarded" should be -- discharged --.

Column 12, Line 60, "significant" should be -- insignificant --.

Column 13, Line 26, "response" should be -- repose --.

Column 13, Line 57, "response" should be -- repose --.

Column 14, Line 21, "relativey" should be -- relatively --.

Column 15, Line 58, "and" should be -- the --.

Column 16, Line 14, "is" should be -- be --.

UNITED STATES PATENT OFFICE
CERTIFICATE OF CORRECTION

Patent No. 4,017,309        Dated April 12, 1977

Inventor(s) Paul H. Johnson

It is certified that error appears in the above-identified patent and that said Letters Patent are hereby corrected as shown below:

Column 20, Line 3, "to" (second occurrence) should be -- of --.

Column 20, Line 14, "80 to 95" should be -- 80% to 95% --.

Column 20, Line 23, "85 to 108" should be -- 85% to 108% --.

Column 20, Line 46, "$kg/cm^3$" should be -- $kg/m^3$ --.

Column 22, Line 36, "material" should be -- metal --.

Signed and Sealed this fifth Day of July 1977

[SEAL]

Attest:

RUTH C. MASON  
Attesting Officer

C. MARSHALL DANN  
Commissioner of Patents and Trademarks